Dec. 1, 1970     J. J. BATES     3,544,868
DYNAMO ELECTRIC MACHINES
Filed Jan. 19, 1968     2 Sheets-Sheet 1
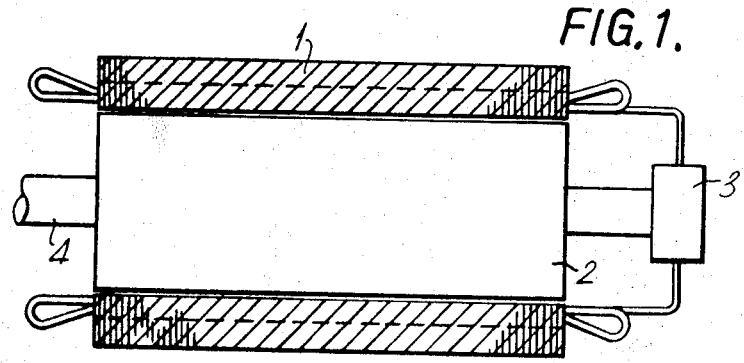
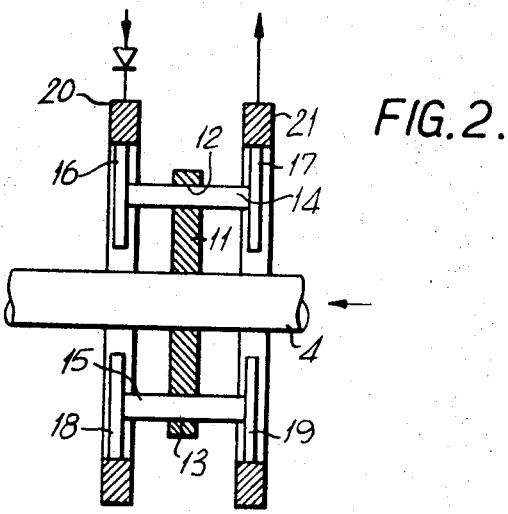
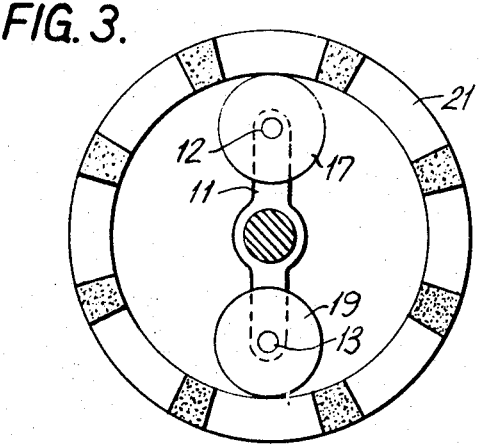

Dec. 1, 1970   J. J. BATES   3,544,868
DYNAMO ELECTRIC MACHINES
Filed Jan. 19, 1968   2 Sheets-Sheet 2

United States Patent Office 3,544,868
Patented Dec. 1, 1970

3,544,868
DYNAMO ELECTRIC MACHINES
James John Bates, Swindon, England, assignor to National Research Development Corporation, London, England, a corporation of Great Britain
Filed Jan. 19, 1968, Ser. No. 699,074
Claims priority, application Great Britain, Jan. 25, 1967, 3,845/67
Int. Cl. H02p 7/28
U.S. Cl. 318—138      3 Claims

ABSTRACT OF THE DISCLOSURE

In a D.C. electric machine the commutator brushes are replaced by freely rotating wheels and separate switching means are employed to switch current from the wheels before they roll off a commutator segment so that the commutator acts as an off-load distributor. The machine windings and the commutator are inverted and current to the wheels supplied from slip rings through the wheel axles.

---

This invention relates to dynamo-electric machines and is concerned with commutation arrangements therefor.

According to the present invention a dynamo-electric machine is provided with a commutation arrangement comprising a commutator having segments of conductive material separated by segments of insulating material, contact members in the form of freely rotating wheels which bear on the commutator with rolling contact, and switching means for ensuring that current flow to a wheel ceases before it leaves contact with a segment.

The switching means may comprise a thyristor-assisted commutation arrangement as described, for example, in United States Pat. No. 3,453,513. In such a machine the commutator need have very many fewer segments than a conventional commutator and each segment then spans an appreciable arc of the rotor, although the invention is equally applicable to machines in which the commutator has a large number of narrow segments. The latter kind of machine may be preferable in certain circumstances due to more even torque. A machine with thyristor-assisted commutation may be of inverted construction, that is to say the armature winding is provided on the stator or outer stationary part of the machine while the field winding is provided on the rotor or inner rotating part. An inverted machine requires an inverted commutator, in which the segments are secured to the stator and the contact members rotate with the rotor and are supplied through a slip ring arrangement. This construction is particularly suited to the present invention since electrical contact to both the commutator and slip rings can be provided by rolling contact members and an axle carrying a pair of wheels may be secured to the rotor with one of the wheels bearing on a slip ring and the other wheel bearing on the commutator.

Figure 4:
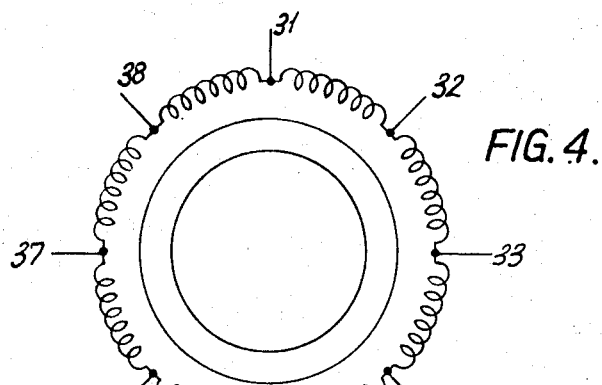
Figure 5:
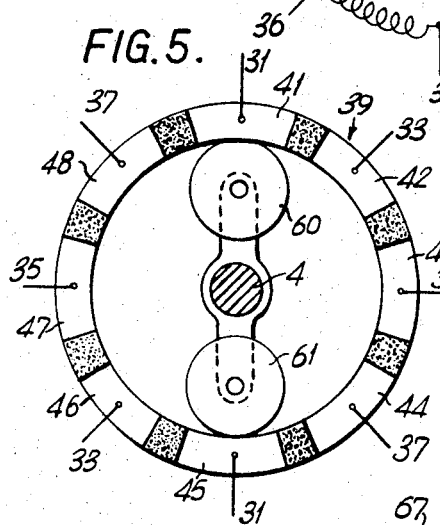
Figure 6:
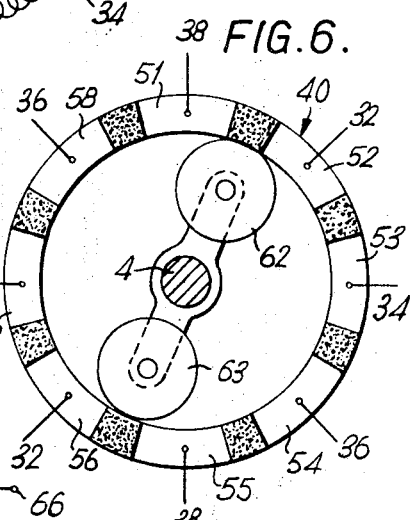
Figure 7:
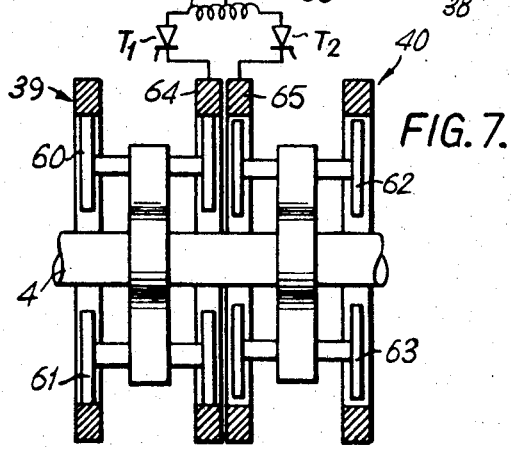

In order that the invention may be more fully understood reference will now be made to the accompanying drawings in which:

FIG. 1 illustrates diagrammatically an inverted D.C. machine embodying the invention, FIG. 2 illustrates in a section through the rotor shaft a commutator arrangement embodying the invention for an inverted machine, FIG. 3 is a view of the arrangement illustrated in FIG. 2 viewed in the direction of the arrow in FIG. 2, FIG. 4 illustrates diagrammatically an armature winding of a D.C. machine, FIG. 5 and FIG. 6 illustrate a pair of commutators utilised to commutate the winding of FIG. 4, FIG. 7 illustrates the commutators of FIG. 5 and FIG. 6 and the supply connections thereto in a view parallel to the axis of the machine.

Referring now to FIG. 1, there is shown therein a D.C. electric machine which can be either a generator or a motor and which is of inverted construction, that is to say, it has an outer stator 1 carrying an armature winding and an inner rotor 2 carrying a field winding. Electrical connection to the armature winding on the stator is required to be through a commutation arrangement which is inverted with the segments thereof stationary and the contact members mounted to rotate with the shaft 4. Means are provided for connecting the positive and negative supply terminals to the rotating contact members as will be explained hereafter.

The commutation arrangement illustrated in FIG. 1 may take the form shown in FIG. 2 and FIG. 3. The shaft 4 of the rotor has attached thereto a cross-piece 11 rotating therewith. The cross-piece has two bores 12 and 13 near opposite ends through which there extends axles 14 and 15 which are freely rotatable within bores 12 and 13. A pair of wheels 16 and 17 are attached to opposite ends of axle 14 and similarly a pair of wheels 18 and 19 are attached to opposite ends of axle 14. Wheels 16 and 18 make contact with the internal surface of a fixed slip ring 20 connected to one of the electrical supply terminals of the machine. Wheels 17 and 19 make contact with a fixed commutator 21, the conducting and insulating segments of which are shown more clearly in FIG. 3. The conducting segments are connected to the armature winding on the stator. It will be seen that by this arrangement electrical contact is made from slip ring 20 to commutator 21 through the wheels. For convenience opposite conducting segments of the commutator 21 can be connected together and to the appropriate parts of the armature winding. By this means the current carried by each wheel is halved since the current from a supply terminal to the commutator is carried by two wheels diametrically opposite each other. The arrangement of FIG. 2 and FIG. 3 is duplicated for the other supply terminal.

An advantage of the arrangement illustrated is that since rolling contact is used and not sliding contact there is no possibility of the formation of a conductive track across the insulating segments of the commutator as would occur with carbon brushes. Thus it is possible to considerably increase the voltage applied to the armature winding of the machine without the danger of flash-over between adjacent commutator segments.

One arrangement employing thyristor-assisted commutation is illustrated in FIGS. 4, 5, 6, and 7. In this arrangement a closed armature winding 30 illustrated diagrammatically in FIG. 4 has eight external connections numbered 31 to 38 inclusive. Electrical connection from one supply terminal to armature winding 30 is by way of a pair of commutators 39 and 40 illustrated in FIG. 5 and FIG. 6 respectively. Commutator 39 has eight conductive segments numbered 41 to 48 inclusive and similar commutator 40 has eight segments numbered 50 to 58 inclusive. The connections 31 to 38 of armature winding 30 are taken to the various segments of commutators 39 and 40 in the manner indicated. Connection 31 is taken to the diametrically opposite segments 41 and 45 of commutator 39, connection 32 is taken to diametrically opposite segments 52 and 56 of commutator 40 and so on. Thus successive connections of the armature are taken alternately to each commutator.

Electrical contact to commutator 39 is by way of a pair of wheels 60 and 61 and similarly electrical contact to commutator 40 is by way of another pair of wheels 62 and 63. Wheels 60 and 61 are supplied from a slip ring 64 illustrated in FIG. 7 by an arrangement identical to that illustrated in FIGS. 2 and 3. Wheels 62 and 63 are supplied from a slip ring 65 in an analogous manner. It will be noted however that the line joining the centres of wheels 62 and 63 on commutator 40 is angularly displaced from the line joining the centres of wheels 60 and 61 on commutator 39. The angular displacement is such that when wheels 60 and 61 contact the centres of a conducting segment on commutator 39 wheels 62 and 63 contact the insulation midway between two conducting segments on commutator 40. Slip rings 64 and 65 are connected to a common supply terminal 66 through a pair of thyristors T1 and T2.

The arrangement illustrated in FIGS. 5, 6, and 7 suffice to provide electrical connection from one supply terminal only to armature winding 30. Connection from the other supply terminal is provided by a duplicate arrangement to that illustrated in these figures appropriately connected to armature winding 30.

The operation of the machine when rotating in the direction of the arrows in FIG. 5 and FIG. 6 is such that with the contact wheels in the position illustrated let it be assumed that thyristor T1 is conducting. Accordingly current flows from positive terminal 66 through thyristor T1, slip ring 64 and wheels 60 and 61 to segments 41 and 45 of commutator 39 and thence through connection 31 to armature winding 30. The return path for the current is through a duplicate arrangement of commutators and thyristors (not shown) to the negative supply terminal. As the shaft 4 of the machine rotates wheels 62 and 63 will make contact with segments 52 and 56 of commutator 40 but no current will flow through commutator 40 until thyristor T2 is triggered and this is arranged to take place when wheels 62 and 63 have made proper contact with segments 52 and 56. Since the angular spread of the conductive segments is greater than the angular spread of the intervening insulating portions it will be realised that wheels 60 and 61 will still be in contact with segments 41 and 45 of commutator 39 when thyristor T2 is fired. Accordingly commutation now takes place in the armature coil between the connections 31 and 32 and in like manner in the armature coil between connections 35 and 36. Means are provided for generating an extinction voltage for thyristor T1 in the closed circuit including connections 31 and 32 and the thyristors T1 and T2. This extinction voltage may be generated by interpoles on the rotor and is sufficient to ensure that thyristor T1 is extinguished before wheels 60 and 61 leave conductive segments 41 and 45. At low speeds the extinction voltage may be injected as an alternating voltage to the commutating transformer 67. Current flow to connection 31 then ceases and current flows through thyristor T2, slip rings 65, and commutator 40 to connections 32 of the armature until wheels 60 and 61 make contact with segments 42 and 46 of commutator 39, when thyristor T1 is triggered and commutation takes place in the armature coil between connections 32 and 33. This process is continuously repeated as the rotor rotates.

In a machine constructed in the manner described above the armature winding on the stator can take the form of a conventional wave or lap winding with an appropriate number of tappings. Furthermore although the machine is an inverted form of D.C. machine the thyristors are stationary. Preferably the machine is long and of small diameter and the current distribution arrangement indicated by the reference 3 in FIG. 1 is external to the machine to enable it to be readily insulated and enclosed to maintain cleanliness. Such a machine can be designed for extremely high voltages. Thus for example with an armature having 32 tappings and having a voltage of 700 volts induced in the commutating coil the voltage generated by the armature would be approximately 16×700, or 11,000 volts. If four thyristors each rated at 700 v. 300 a. are used then the motor would have a output of 3,500 H.P. Such a motor would draw relatively little current compared with a conventional D.C. machine of this rating. A voltage of 11,000 is by no means a limit and a machine operating at 33,000 volts can be constructed since the design of the stator is similar to that in A.C. machines which operate at this voltage.

I claim:
1. A dynamo-electric machine comprising:
   a stator armature winding;
   a rotor field winding mounted for rotation about a shaft;
   a commutation arrangement for said armature winding said commutation arrangement comprising;
   a plurality of fixed commutators each having segments of conductive material separated by segments of insulating material;
   electrical contact wheels bearing on said fixed commutators;
   axles mounted to rotate with said rotor shaft and on which said wheels are freely rotatable;
   electrical connections to said axles including further wheels mounted on said axles and fixed slip rings on which said further wheels bear; and
   switching means for ensuring that current flow to a slip ring ceases before the wheel to which the slip ring is electrically connected leaves contact with said conductive commutator segment.

2. A machine as in claim 1 wherein two commutating wheels spaced apart diametrically opposite from each other around said rotor shaft bear on each of said commutators, each of said commutating wheels being connected through axles to further wheels bearing on a common slip ring.

3. A machine as in claim 2 wherein diametrically opposite conductive segments on said commutators are connected to a common point on said armature winding.

References Cited
UNITED STATES PATENTS

| | | | |
|---|---|---|---|
| 290,350 | 12/1893 | Paine | 310—238 |
| 3,122,659 | 2/1964 | Krestel et al. | 307—136 |
| 3,241,023 | 3/1966 | Eby | 318—330X |
| 3,295,091 | 12/1966 | Von Mossin | 310—219X |
| 3,341,726 | 9/1967 | Brinster et al. | 310—231X |
| 3,372,288 | 3/1968 | Wigington | 307—136 |

GLEN R. SIMMONS, Primary Examiner

U.S. Cl. X.R.

307—136; 310—220; 318—231, 238, 439